Figure 1:
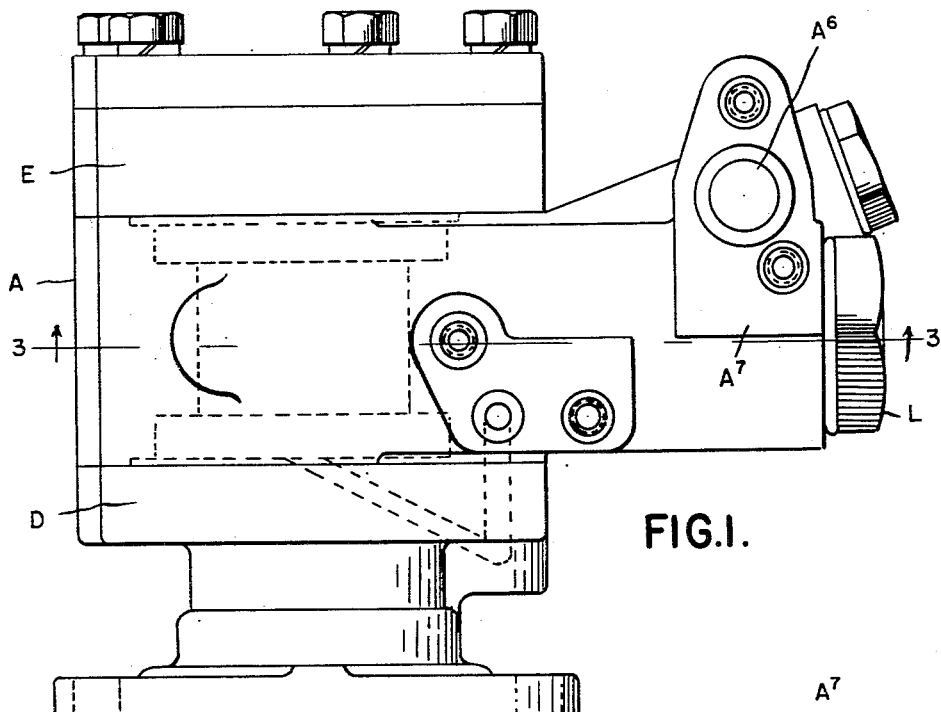

Jan. 4, 1955

C. F. HAMMOND 2,698,579

CONSTANT DELIVERY PUMP

Filed July 12, 1951

2 Sheets-Sheet 1

INVENTOR.
CHARLES F. HAMMOND
BY
Whittemore Hulbert + Belknap
ATTORNEYS

INVENTOR.
CHARLES F. HAMMOND

United States Patent Office 2,698,579
Patented Jan. 4, 1955

2,698,579

CONSTANT DELIVERY PUMP

Charles F. Hammond, Grosse Pointe, Mich., assignor to Gemmer Manufacturing Company, Detroit, Mich., a corporation of Michigan Application July 12, 1951, Serial No. 236,392

4 Claims. (Cl. 103—42)

The invention relates to liquid propelling pumps and more particularly to the rotary type.

It is the primary object of the invention to obtain a construction in which the fluid is delivered at substantially constant velocity without regard to the velocity of the driving means for the pump.

It is a further object to accomplish this result with a minimum loss of power at all speeds of operation, or in other words to obtain high efficiency.

To this end the invention consists in the construction as hereinafter set forth.

Figure 2:
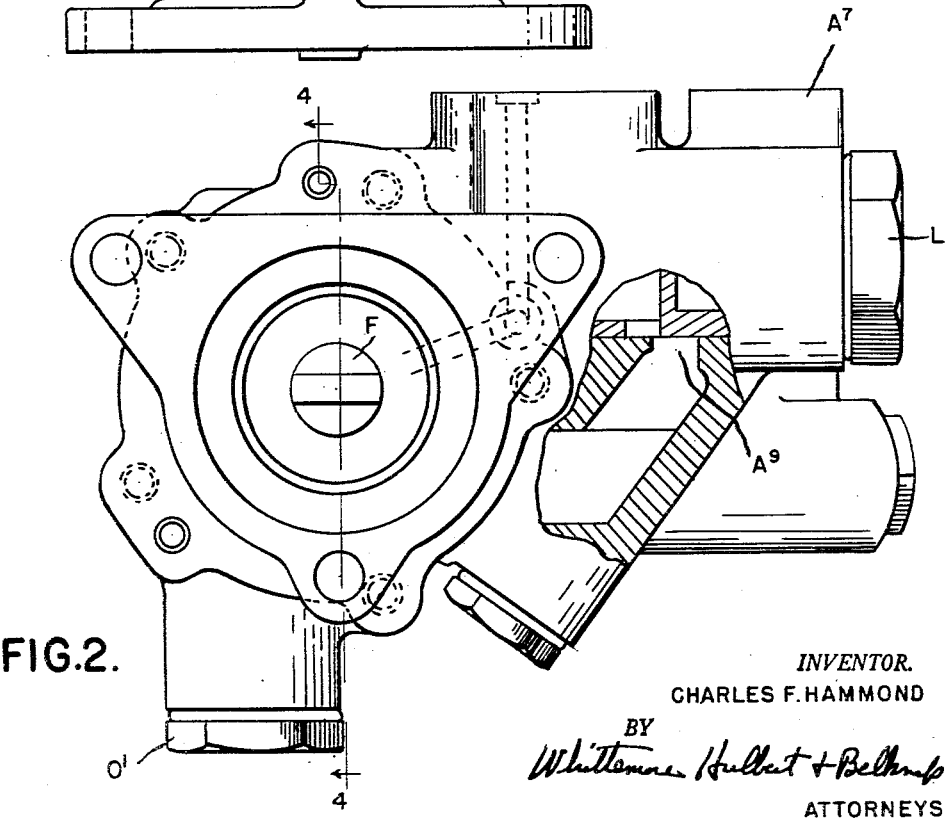
Figure 3:
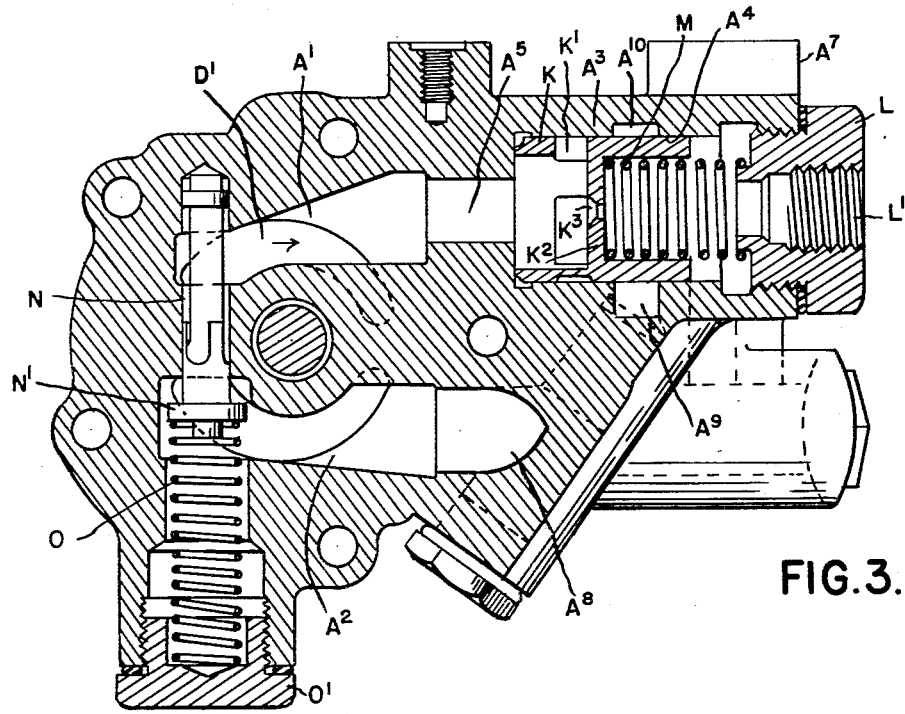
Figure 4:
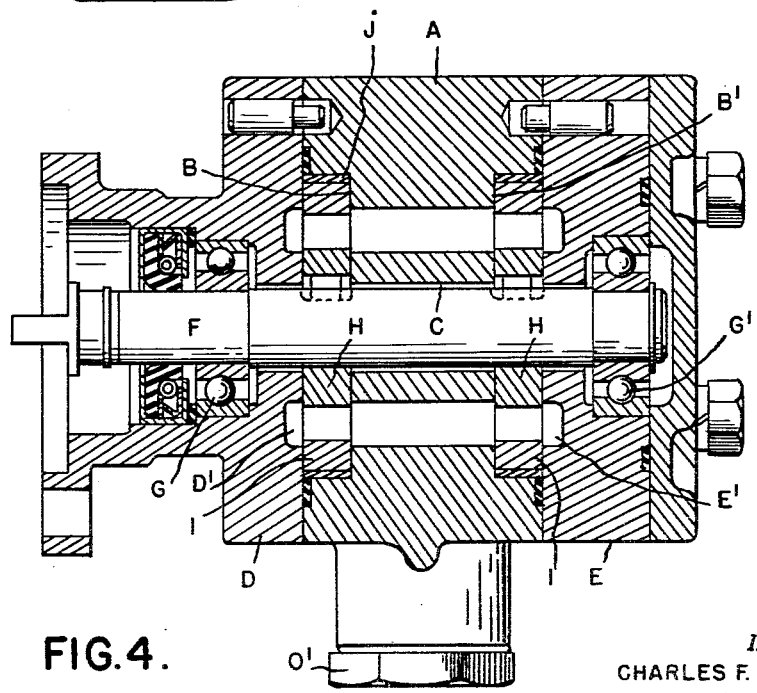

In the drawings:

Fig. 1 is a plan view of the pump;
Fig. 2 is a side elevation thereof;
Fig. 3 is a section on line 3—3, Fig. 1; and
Fig. 4 is a section on line 4—4, Fig. 2.

My improvements are applicable to liquid pumps of different specific constructions but, as illustrated, the pump is of the rotary type and with a specific construction of impeller. The pump housing includes a body member A which has on opposite sides thereof circular recesses B, B' having a common axis and a circular aperture C of smaller diameter extending through the body and having its axis eccentric to that of the recesses B. D and E are heads bolted or otherwise secured to the member A on opposite sides thereof closing the circular recesses. F is a shaft extending through said heads and the aperture C in the body member A, and G, G' are bearings for the shaft respectively in the heads D and E. Within the circular recesses B, B' are located fluid propelling means, preferably intermeshing external and internal gears. The external gears H are keyed to the shaft F, and the internal gears I are journaled in the circular recesses B, B', each of which has a bushing J therein of bearing material. The gears I are driven by the gears H and form expanding and contracting chambers therebetween on opposite sides of the axial plane of intermeshing engagement.

The heads D and E have segmental recesses D', E' therein on opposite sides of said axial plane and the member A has recesses A', $A^2$ registering in part with said recesses D', E'. The member A is further provided with a lateral extension $A^3$. In this extension there is formed a cylindrical recess $A^4$ open at its outer end and connected by a passage $A^5$ with the recess A'. The recess $A^2$ is connected by intersecting bores plugged at their outer ends with a fluid inlet $A^6$ in a boss $A^7$ at the top of the member A. These intersecting bores form a passage $A^8$ for the inlet fluid, a portion of which passage is in fairly close proximity to the cylindrical recess $A^4$. A bypass $A^9$, including an annular recess $A^{10}$ surrounding the cylindrical recess $A^4$, forms a connection of fairly large capacity between the adjacent portions of the cylindrical recess $A^4$ and adjacent portion of the passage $A^8$. Thus, in the absence of a controlling valve, the pump would be short circuited.

For controlling the bypass, a piston K engages the cylindrical recess $A^4$ and in one position thereof, to the left Fig. 3, completely closes the annular groove $A^{10}$. When, however, the piston is moved outward ports K' therein come into registration with the groove $A^{10}$ to open the bypass. The piston K is hollow but has a cross partition $K^2$ therein provided with a restricted port $K^3$ therein for passage therethrough of outgoing fluid. The outer end of the recess $A^4$ is closed by a screw cap L having a central passage L' therethrough for the discharge of fluid and which may be connected to an external conduit. A spring M abutting against the cap L with its opposite end against the partition $K^2$ biases the piston to close the annular groove $A^{10}$. If desired the pump may be provided with a second bypass N formed in the portion of the member A which is between the recesses A' and $A^2$. A check valve N' normally closes this bypass and is under the resilient pressure of a spring O, the outer end of which abuts against a closure cap O'.

In operation the pump is driven by any suitable driving connection to the outer end of the shaft F, which rotates the impellers clockwise Fig. 3, to receive fluid from the recess $A^2$ and discharge it into the recess A'. From the recess A' the fluid is discharged axially through the small port $K^3$ of the piston K and because of the restriction of this port will build up hydraulic pressure for moving the valve to the right Fig. 3. If the quantity of fluid discharged by the impellers is greater than can pass through the restricted port $K^3$, the valve will be moved to open the bypass and return the surplus fluid to the inlet side of the impeller. Due to the fact that the bypass is very direct and of large capacity, there will be comparatively low resistance to the return of the surplus fluid, which will cut down on the power required for operating the pump.

What I claim as my invention is:

1. A pump for delivering liquid at substantially uniform velocity when driven at variable speeds, comprising a rotary impeller, a housing therefor having fluid inlet and delivery passages therein with a direct bypass therebetween, a valve in said delivery passage obstructing the same and also controlling said bypass, being biased to close the latter and being variably opened by the differential of opposed fluid pressures thereon respectively from the portions of said delivery passage on opposite sides of said valve, and a restricted passage forming the sole fluid connection between said portions of said delivery passage on opposite sides of said valve.

2. The construction as in claim 1 in which said inlet and outlet passages extend into proximity to each other with the bypass therebetween of the full capacity thereof.

3. The construction as in claim 1 in which the delivery passage has a cylindrical portion provided with a central port therein connected to said bypass, a piston in said cylindrical portion constituting said obstruction and controlling valve and having a port therethrough constituting the said restricted passage, and a spring forming the biasing means for moving said piston to close said port.

4. In a rotary pump, a housing having a rotor chamber therein, rotor means operable in said rotor chamber and defining variable pumping chambers therein for producing a pumping action, said housing also having intake and discharge ports therein adapted respectively to supply intake fluid to and receive pump fluid from said pumping chambers, means defining a valve chamber having a valve seat therein and having communication with said intake and discharge ports on opposite sides of said valve seat, a valve member movable in said valve chamber for cooperating with said seat, spring means effective on said valve member for urging the same toward a closed position, means defining a delivery passage for the external delivery of fluid from the pump having communication with said valve chamber, and means defining a permanently open flow control orifice connecting said delivery passage with the discharge port, the movement of said valve member relative to said seat being responsive to the resultant force produced by said spring means and the fluid pressure differential across the orifice, said permanently open flow control orifice being located in and carried by said movable valve member.

References Cited in the file of this patent

UNITED STATES PATENTS

| | | |
|---|---|---|
| 839,331 | Stevens | Dec. 25, 1906 |
| 1,080,322 | Brown | Dec. 2, 1913 |
| 1,411,054 | Marshall | Mar. 28, 1922 |
| 2,123,815 | Tweddell | July 12, 1938 |
| 2,195,478 | Blazek et al. | Apr. 2, 1940 |